United States Patent
Natarajan et al.

(10) Patent No.: US 11,093,266 B2
(45) Date of Patent: Aug. 17, 2021

(54) USING A GENERATIVE MODEL TO FACILITATE SIMULATION OF POTENTIAL POLICIES FOR AN INFRASTRUCTURE AS A SERVICE SYSTEM

(71) Applicant: Microsoft Technology Licensing, LLC, Redmond, WA (US)

(72) Inventors: Gowtham Natarajan, Redmond, WA (US); Karel Trueba Nobregas, Seattle, WA (US); Abhisek Pan, Bellevue, WA (US); Karthikeyan Subramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 389 days.

(21) Appl. No.: 16/160,891

(22) Filed: Oct. 15, 2018

(65) Prior Publication Data

US 2020/0117492 A1    Apr. 16, 2020

(51) Int. Cl.
    *G06F 9/455*    (2018.01)
(52) U.S. Cl.
    CPC .......... *G06F 9/455* (2013.01); *G06F 9/45558* (2013.01)
(58) Field of Classification Search
    CPC .......... G06F 17/18; G06F 17/11; G06F 17/12; G06F 17/13; G06F 9/505; G06F 2009/4557
    See application file for complete search history.

(56) References Cited

U.S. PATENT DOCUMENTS

| | | | |
|---|---|---|---|
| 2012/0042061 A1 | 2/2012 | Ayala et al. | |
| 2012/0060167 A1 | 3/2012 | Salsburg et al. | |
| 2013/0325419 A1 | 12/2013 | Al-shaikh et al. | |
| 2013/0346614 A1 | 12/2013 | Baughman et al. | |
| 2014/0082612 A1 | 3/2014 | Breitgand et al. | |
| 2014/0222745 A1* | 8/2014 | Deng | G06Q 10/00 706/47 |
| 2015/0039764 A1 | 2/2015 | Beloglazov et al. | |
| 2016/0043968 A1* | 2/2016 | Jacob | G06F 9/5061 709/226 |
| 2017/0031423 A1* | 2/2017 | Mandagere | G06F 9/5088 |
| 2018/0232261 A1* | 8/2018 | Crabtree | H04L 67/42 |

(Continued)

OTHER PUBLICATIONS

Stier et al., "Rapid Testing of IaaS Resource Management Algorithms via Cloud Middleware Simulation" (Mar. 2018), Proceedings of the 2018 ACM/SPEC International Conference on Performance Engineering, pp. 184-191 [retrieved from https://dl.acm.org/doi/abs/10.1145/3184407.3184428], (Year: 2018).*

(Continued)

*Primary Examiner* — Brian W Wathen
(74) *Attorney, Agent, or Firm* — Ray Quinney & Nebeker, P.C.; Thomas M. Hardman; Henry Gabryjelski (57) ABSTRACT

A method for evaluating at least one potential policy for an IaaS system may include determining a predicted workload for the IaaS system based on at least one generative model corresponding to the IaaS system. The at least one potential policy for the IaaS system may be simulated based on the predicted workload, thereby producing one or more simulation metrics that indicate effects of the at least one potential policy. The performance of the IaaS system may be optimized based on the one or more simulation metrics.

16 Claims, 9 Drawing Sheets

(56) References Cited

U.S. PATENT DOCUMENTS

2019/0007410 A1* 1/2019 Hu .................. H04L 47/70
2019/0065939 A1* 2/2019 Bourgoin ............ G06N 3/0454
2020/0099592 A1* 3/2020 Mahindru ........... G06F 16/1734

OTHER PUBLICATIONS

"CloudStress—Testing beyond networks", Retrieved From: https://web.archive.org/web/20160410004042/hhttps:/www.spirent.com/Products/Temeva/CloudStress, Apr. 10, 2016, 5 Pages.

Goswami, et al., "ALVEC: Auto-scaling by Lotka Volterra Elastic Cloud: A QoS aware Non Linear Dynamical Allocation Model", In Journal of Computing Research Repository, May 2018, pp. 1-42.

Kim, et al., "PICS: A Public IaaS Cloud Simulator", In Proceedings of IEEE 8th International Conference on Cloud Computing, Jun. 27, 2015, pp. 1-10.

Magalhaes, et al., "Workload modeling for resource usage analysis and simulation in cloud computing", In Journal of Computers and Electrical Engineering, vol. 47, Oct. 2015, pp. 69-81.

Mann, et al., "Which is the best algorithm for virtual machine placement optimization", In Proceedings of Concurrency and Computation: Practice and Experience, vol. 29, Issue 10, May 25, 2017, pp. 1-25.

Piraghaj, et al., "ContainerCloudSim: An environment for modeling and simulation of containers in cloud data centers", In Journal of Software: Practice and Experience, vol. 47, Issue 4, Apr. 2017, pp. 505-521.

Show, Durbar, "Creation and Allocation of Virtual Machines for Execution of Cloudlets in Cloud Environment", In Thesis of National Institute of Technology, May 2014, 33 Pages.

Alipour, et al., "Online Machine Learning for Cloud Resource Provisioning of Microservice Backend Systems", In Proceedings of the IEEE International Conference on Big Data, Dec. 11, 2017, pp. 2433-2441.

"International Search Report and Written Opinion Issued in PCT Application No. PCT/US2019/052522", dated Jan. 7, 2020, 15 Pages.

Shariffdeen, et al., "Workload and Resource Aware Proactive Auto-Scaler for PaaS Cloud", In Proceedings of the IEEE 9th International Conference on Cloud Computing, Jun. 27, 2016, pp. 11-18.

* cited by examiner

| Account Type \ Lifetime | 0 to 15 mins | 15 to 60 mins | 60 mins to 1 day | > 1 day |
|---|---|---|---|---|
| External | 0.06 | 0.13 | 0.50 | 0.29 |
| Internal | 0.28 | 0.33 | 0.28 | 0.10 |

FIG. 2A

| Priority \ Lifetime | 0 to 15 mins | 15 to 60 mins | 60 mins to 1 day | > 1 day |
|---|---|---|---|---|
| False | 0.26 | 0.30 | 0.30 | 0.12 |
| True | 0.04 | 0.11 | 0.62 | 0.21 |

USING A GENERATIVE MODEL TO FACILITATE SIMULATION OF POTENTIAL POLICIES FOR AN INFRASTRUCTURE AS A SERVICE SYSTEM

CROSS-REFERENCE TO RELATED APPLICATIONS

N/A

BACKGROUND

Cloud computing is the delivery of computing services (e.g., servers, storage, databases, networking, software, analytics) over the Internet. There are several reasons why many organizations are turning to cloud computing services. For example, cloud computing eliminates the capital expense of buying hardware and software and setting up and running on-site data centers. In addition, many cloud providers offer a broad set of policies, technologies, and controls that protect an organization's data, applications, and infrastructure from potential threats.

Infrastructure as a service (IaaS) is a form of cloud computing that provides virtualized computing resources over the Internet. In an IaaS model, a cloud provider hosts physical computing resources such as processors, memory, storage, and networking hardware. A virtualization layer, which may be referred to as a hypervisor, may be provided to enable the creation of multiple virtual machines that exist on the same physical computer but are isolated from one another.

Virtual machines can be used in many different ways. For example, because demand for a particular application can fluctuate, an organization may choose to use an IaaS platform that allows the creation of one or more virtual machines to run the application. When demand for the application increases, additional virtual machines may be purchased. Conversely, when demand decreases, the virtual machines that are no longer needed may be shut down.

DETAILED DESCRIPTION

An IaaS provider may offer certain types of information technology (IT) infrastructure, such as virtual machines and other resources, to its users (e.g., customers). These resources may be supplied on-demand from large pools of physical computing resources. These computing resources may collectively form an IaaS system that includes many different data centers, which may be located in different geographical regions. Each data center may include multiple clusters, and each cluster may include multiple nodes. The nodes are the computers that run the virtual machines. The nodes may alternatively be referred to as host machines, host computers, hosts, etc.

In the context of virtual machines, the term "allocation" may refer to the selection of particular physical computing resources to be used for creating and running virtual machines. For example, when a user of an IaaS system requests a virtual machine, the IaaS system may select a particular data center where the virtual machine will be created. The IaaS system may also select a particular cluster within the selected data center, as well as a particular node within the selected cluster. In other words, computing resources within the selected data center, cluster, and node are allocated to creating and running the virtual machine.

Various policies may be defined for the allocation of virtual machines within an IaaS system. In this context, the term "policy" refers generally to one or more algorithms, parameters, settings, rules, protocols, strategies, or guidelines that control or affect how an IaaS system allocates virtual machines. For example, when a user requests a virtual machine, a cluster selection algorithm may control the selection of the data center and the cluster that will host the virtual machine. Within the selected cluster, a packing algorithm may control the selection of the node for the virtual machine. The cluster selection algorithm and packing algorithm are examples of policies as that term is used herein. As another example, one or more policies may set limits on the amount of resources within a particular node or cluster that can be allocated in order to keep sufficient resources available for future expansion of existing virtual machines. In other words, limits may be provided that indicate when a cluster should stop accepting new traffic, and/or when a node within a cluster should no longer be used for allocation of virtual machines.

Administrators of an IaaS system generally want to select policies that will use the available physical computing resources in the most efficient way. It can, however, be difficult to know which policies would be optimal for an IaaS system. For example, there is a tradeoff between maximizing utilization of the computing resources within an IaaS system and minimizing failures (i.e., instances where there are not sufficient computing resources available to fulfill customer requests). If maximizing utilization were the only consideration, it would be desirable to allocate as much of the available computing resources as possible to providing virtual machines (or other computing resources) for users. To minimize failures, however, it is generally desirable to keep some percentage of the available computing resources available for future expansion of existing virtual machines. It can be difficult to find the optimal balance between these competing goals. As another example, it is generally desirable to allocate virtual machines so as to minimize fragmentation. Without careful planning, however, this goal can be difficult to achieve.

One approach for evaluating the effectiveness of a particular policy is to implement the policy and see how it affects the performance of the IaaS system (e.g., see how much capacity is utilized, how many failures occur, how much fragmentation there is). However, this approach has significant drawbacks. For example, if the policy negatively affects the performance of the IaaS system, users of the IaaS system may notice the degradation in performance. This may cause the users to become dissatisfied with the IaaS system and consider switching to a different IaaS provider.

The present disclosure is generally related to techniques for evaluating the effectiveness of potential policies for an IaaS system. Advantageously, the techniques disclosed herein allow potential policies to be simulated before they are actually implemented in the IaaS system. For example, suppose that the administrators of an IaaS system are trying to decide between several different algorithms (e.g., cluster selection algorithms and/or packing algorithms). The techniques disclosed herein allow simulations to be performed for each of the various algorithms. The algorithm that produces the most favorable simulation results may then be implemented in the IaaS system. As another example, several different simulations may be performed with allocation limits set to different values. The allocation limit that produces the most favorable simulation results may be selected for implementation in the IaaS system. As yet another example, if one or more new features are being considered for an IaaS system (e.g., providing a new virtual machine size), simulations of the new features may be performed to determine whether or not the new features should be implemented. Simulations may also be performed for various combinations of potential policies. Simulations may be performed to validate the correctness and performance of policies or combinations of policies related to an IaaS system.

To facilitate the simulation of potential policies, the workload for the IaaS system may be predicted for a relevant time interval. In this context, the term "workload" may refer to various tasks and/or traffic that may be performed and/or experienced by an IaaS system, such as creating a virtual machine, upgrading a virtual machine (e.g., increasing the size of the virtual machine), and deleting a virtual machine. An IaaS system typically performs these tasks in response to user requests. The term "predicted workload" may refer to various tasks and/or traffic that are predicted to be performed and/or experienced by an IaaS system based on historical data. In other words, a predicted workload may be an artificial workload that is representative of an actual, real-world workload that is experienced by the IaaS system.

In this context, the term "generative model" refers to a machine-learning technique for determining the distribution of a set of data and generating new data points with some variations. In accordance with the present disclosure, a generative model may be created based on historical data corresponding to the IaaS system and used to predict what the workload will be for a particular IaaS system. The generative model may indicate causal relationships between variables related to the IaaS system and how the causal relationships change over time. The generative model may also indicate joint probabilities between the variables for which a causal relationship exists. The generative model may be, for example, a Probabilistic Graphical Model.

The predicted workload for an IaaS system may be used to simulate potential policies for the IaaS system. For example, to simulate a potential policy in a particular IaaS system, a virtual IaaS system corresponding to the IaaS system may be created and the potential policy may be implemented in the virtual IaaS system. The virtual IaaS system may then be made to experience the predicted workload (e.g., to perform the predicted tasks) with the potential policy in place.

Simulations of potential policies may produce various metrics that indicate effects of the potential policies. Once simulations have been performed and the relevant metrics have been determined, the performance of the IaaS system may then be optimized based on the simulation metrics. For example, when several different policies are being considered, a policy (or set of policies) that has the most favorable simulation metrics may be selected for implementation in the IaaS system.

Figure 1:
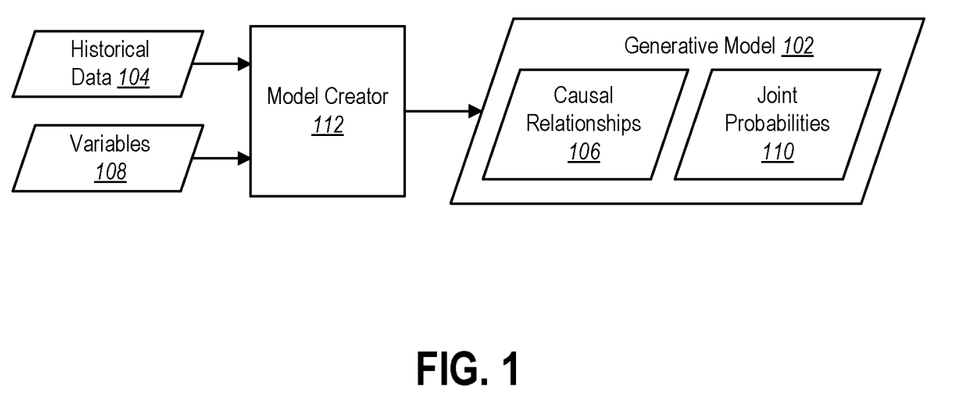
FIG. 1 illustrates an example showing how a generative model for an IaaS system may be created in accordance with the present disclosure.

FIG. 1 illustrates an example showing how a generative model 102 for an IaaS system may be created in accordance with the present disclosure. The generative model 102 may be created based on historical data 104 corresponding to the IaaS system. The historical data 104 may include various tasks that have been performed by the IaaS system over a particular time period.

To create the generative model 102, the historical data 104 may be used to infer causal relationships 106 between variables 108 related to the IaaS system. Information about how the causal relationships 106 change over time may also be determined. Joint probabilities 110 between the variables 108 for which a causal relationship 106 exists may also be determined. A model creator 112 is shown for providing the functionality of creating the generative model 102.

Figure 2:
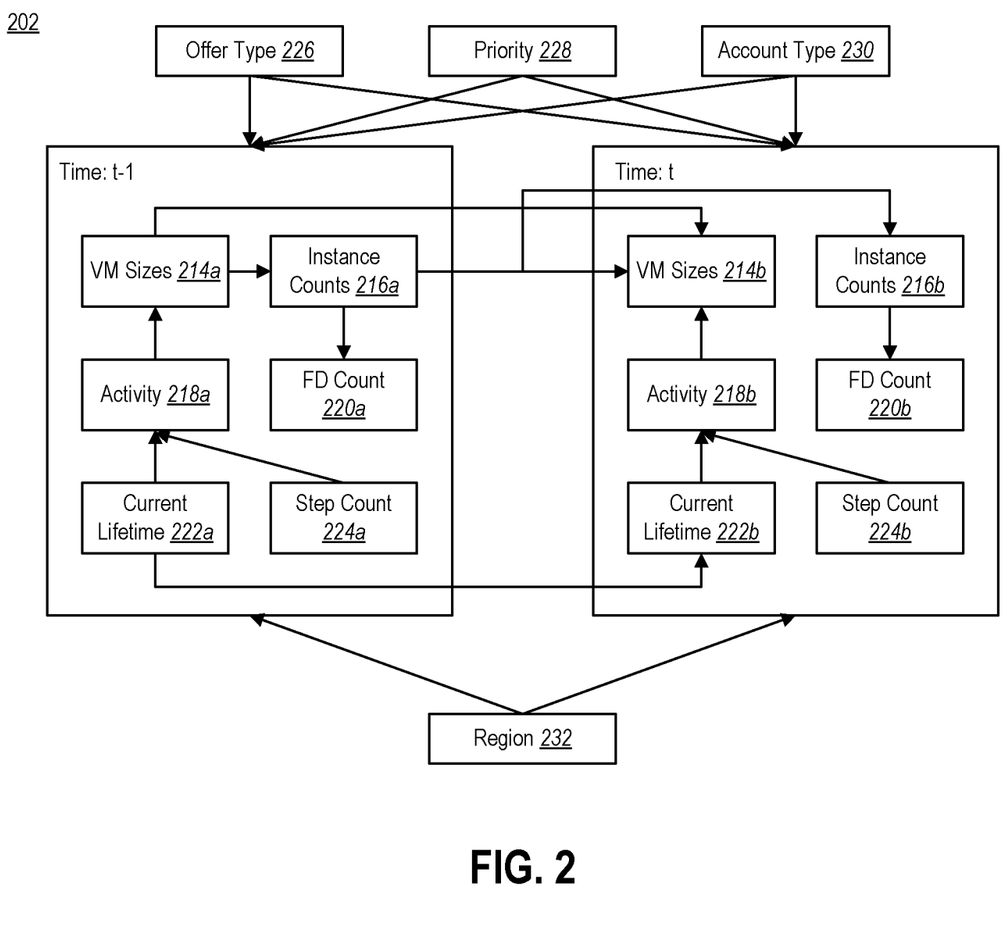
FIG. 2 illustrates an example of a generative model that may be created with respect to an IaaS system in accordance with the present disclosure.

FIG. 2 illustrates an example of a generative model 202 that may be created with respect to an IaaS system in accordance with the present disclosure. In this example, the generative model 202 is a probabilistic graphical model (PGM). A PGM is a statistical model for which a graph expresses the conditional dependence between variables.

The generative model 202 includes two sets of variables that correspond to different points in time (time t−1 and time t). Thus, in addition to modeling static distributions, the generative model 202 may be used to model dynamic distributions where the relationships between variables change over time.

The generative model 202 includes the following variables that correspond to time t−1: virtual machine (VM) sizes 214a, instance counts 216a, activity 218a, fault domain (FD) count 220a, current lifetime 222a, and step count 224a. Similarly, the generative model 202 includes the following variables that correspond to time t: VM sizes 214b, instance counts 216b, activity 218b, FD count 220b, current lifetime 222b, and step count 224b. The generative model 202 also includes several variables that correspond to both time t−1 and time t (and possibly other points in time as well). These variables include offer type 226, priority 228, account type 230, and region 232.

The specific variables that are shown in FIG. 2 are provided for example purposes only and should not be interpreted as limiting the scope of the present disclosure. A generative model in accordance with the present disclosure may include many other variables. Administrators of an IaaS system may select the variables that will provide the most relevant information for the particular implementation under consideration.

As part of creating the generative model 202, strong variable relationships may be determined via conditional independence tests. Relationships may be identified between a variable and several other variables. The generative model 202 includes arrows between some of the variables. An arrow between two variables indicates a causal relationship between those variables. For example, there are two arrows leading away from the variable VM sizes 214a at time t−1. One arrow leads to the variable instance counts 216a at time t−1. The other arrow leads to the variable VM sizes 214b at time t. This means that there is a causal relationship between the variable VM sizes 214a at time t−1 and a) the variable instance counts 216a at time t−1 and b) the variable VM sizes 214b at time t. In other words, the value of the variable VM sizes 214a at time t−1 has some effect on the value of the variable instance counts 216a at time t−1 and the value of the variable VM sizes 214b at time t.

The generative model 202 may include probability information about the relevant variables. Advantageously, the generative model 202 may indicate the joint probabilities between variables [p(y,x)] rather than just the conditional probability [p(y|x)] like most discriminative algorithms. Joint probability is a statistical measure that indicates the probability that two variables, y and x, fall within a particular range or discrete set of values. Thus, the generative model 202 may indicate probabilities that various events involving multiple variables will occur. Consequently, the generative model 202 may be used to provide answers (in terms of probabilities) to questions such as: How likely is it that virtual machines created by particular types of users will live for longer than a specified time period? How much do certain types of users expand a virtual machine after a specified time period? How long do virtual machines from trial customers live? How many virtual machines do certain types of users create? Of course, these specific questions are provided for example purposes only and should not be interpreted as limiting the scope of the present disclosure. A generative model may be used to answer many different types of questions depending on the particular implementation.

Although just a single generative model 202 is shown in FIG. 2, in some implementations multiple generative models may be constructed to understand different sets of relationships. When multiple generative models have been created, information from some or all of the generative models may be used to determine the predicted workload for the IaaS system.

Figure 2A:
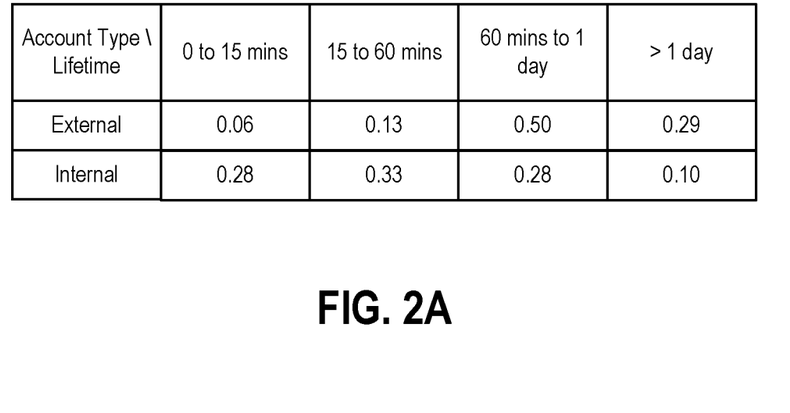
FIGS. 2A and 2B are examples showing how a generative model may indicate the joint probabilities between variables.
Figure 2B:
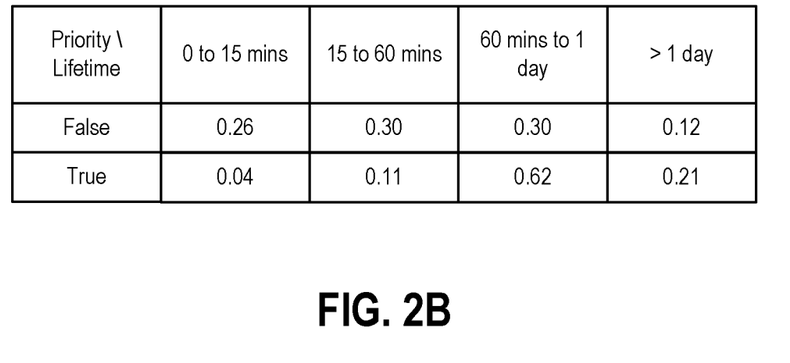

FIGS. 2A and 2B are examples showing how the generative model 202 may indicate the joint probabilities between variables. In FIG. 2A, the relevant variables are "account type" and "lifetime". Probabilities are indicated for different ranges of values of the "lifetime" variable (e.g., 0 to 15 minutes, 15 to 60 minutes, and so forth) for different values of the "account type" variable (e.g., external and internal). In FIG. 2B, the relevant variables are "priority" (an indication of a high-priority customer) and "lifetime". Probabilities are indicated for different ranges of values of the "lifetime" variable for different values of the "priority" variable (e.g., false and true).

In some implementations, an IaaS system may be distributed across many different geographical regions. Since the workload pattern that is experienced by the IaaS system may be different in different geographical regions, different generative models may be constructed for different geographical regions.

Figure 3:
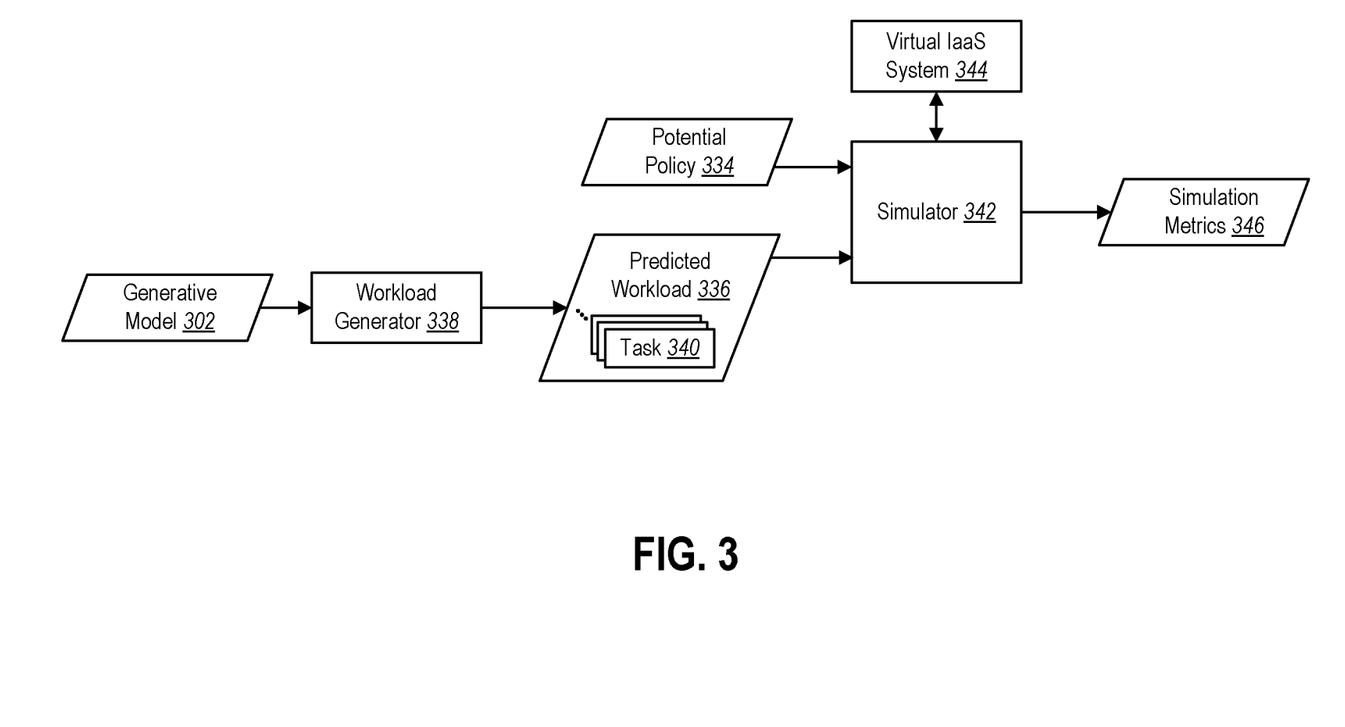
FIG. 3 illustrates an example showing how a generative model may be used to facilitate the simulation of a potential policy for an IaaS system.

FIG. 3 illustrates an example showing how a generative model 302 may be used to facilitate the simulation of a potential policy 334 for an IaaS system. The potential policy 334 may be, for example, a particular type of algorithm (e.g., a cluster selection algorithm, a packing algorithm) that is being considered for implementation in the IaaS system. As another example, the potential policy 334 may be an allocation limit (e.g., for a cluster and/or for a node). As yet another example, the potential policy 334 may be a new feature or combination of features that is being considered for implementation in the IaaS system.

Once a generative model 302 corresponding to an IaaS system has been created, a predicted workload 336 for the IaaS system may be determined based on the generative model 302. A workload generator 338 is shown for providing this functionality. The predicted workload 336 may include various tasks 340 that are predicted to be performed by the IaaS system during a particular time interval. Some examples of tasks 340 include creating a virtual machine, upgrading a virtual machine, and deleting a virtual machine.

The nature of the predicted workload 336 that is generated may be user configurable. For example, it may be possible for a user to request that the predicted workload 336 corresponds to a particular geographical region. It may also be possible for a user to request that the predicted workload 336 have certain characteristics, such as corresponding to a particular family of virtual machines.

The potential policy 334 may be simulated based on the predicted workload 336. A simulator 342 is shown for providing this functionality. To simulate the potential policy 334, a virtual IaaS system 344 may be created. The virtual IaaS system 344 may be a representation of the actual IaaS system in which the potential policy 334 is being considered for implementation. For example, if the actual IaaS system includes N data centers and M clusters in each data center, then the virtual IaaS system 344 may also include N data centers and M clusters in each data center. However, whereas the actual IaaS system includes physical computing resources, the virtual IaaS system 344 may simply be an electronic representation of those physical computing resources. For example, the virtual IaaS system 344 may include various data structures (e.g., files, tables, records) that represent the physical components of the actual IaaS system.

The potential policy 334 may be implemented in the virtual IaaS system 344. The virtual IaaS system 344 may then be made to experience the predicted workload 336 (e.g., to perform the predicted tasks 340) with the potential policy 334 in effect. For example, if the potential policy 334 is an algorithm that is related to allocation of virtual machines (e.g., a cluster selection algorithm, a packing algorithm), then the virtual IaaS system 344 may perform tasks 340 related to the allocation of virtual machines in accordance with that algorithm. As another example, if the potential policy 334 is an allocation limit, then the virtual IaaS system 344 may be constrained by that allocation limit when it allocates virtual machines.

The simulation of the potential policy 334 may produce simulation metrics 346 that indicate the effects of the potential policy 334 on the virtual IaaS system 344 (and therefore, by extension, on the actual IaaS system as well). Some examples of simulation metrics 346 include an indication of the extent to which the capacity of the virtual IaaS system 344 has been utilized, an indication of the allocation success rate (e.g., the rate at which customer requests are successfully fulfilled), and an indication of the extent of fragmentation in the virtual IaaS system 344. The simulation metrics 346 may then be used to optimize the performance of the actual IaaS system.

Figure 4:
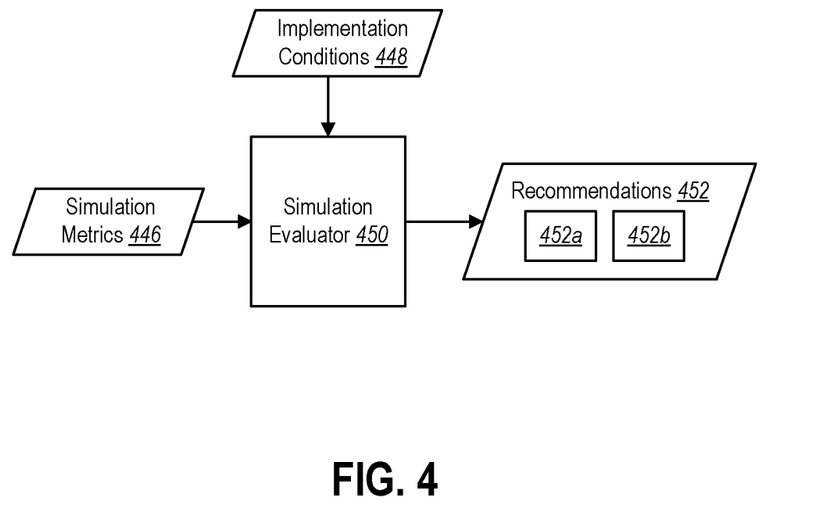
FIG. 4 illustrates an example showing how simulation metrics may be used to optimize the performance of an IaaS system.

FIG. 4 illustrates an example showing how simulation metrics 446 may be used to optimize the performance of an IaaS system. In the depicted example, one or more implementation conditions 448 may be defined for a potential policy. The implementation conditions 448 may indicate under what circumstances the potential policy that is under consideration may be implemented. For example, the implementation conditions 448 may specify one or more threshold levels for one or more of the simulation metrics 446. If the simulation metrics 446 are more favorable than the applicable threshold levels that have been defined (e.g., above a minimum threshold, below a maximum threshold), then the potential policy may be implemented.

A simulation evaluator 450 is shown in FIG. 4 for providing the functionality of determining whether the simulation metrics 446 satisfy the applicable implementation conditions 448. The simulation evaluator 450 may provide one or more recommendations 452 as output. If the simulation evaluator 450 determines that the simulation metrics 446 satisfy the applicable implementation conditions 448, then the simulation evaluator 450 may output a recommendation 452a to implement the potential policy that is under consideration. Conversely, if the simulation evaluator 450 determines that the simulation metrics 446 do not satisfy the applicable implementation conditions 448, then the simulation evaluator 450 may output a recommendation 452b to not implement the potential policy that is under consideration.

To consider a specific example, suppose that the implementation conditions 448 specify a minimum threshold level for an allocation success rate (which is an example of a simulation metric 446). The simulation evaluator 450 may be configured to compare a) the allocation success rate that is determined during a simulation of a potential policy with b) the minimum threshold level. If the allocation success rate that is determined during the simulation exceeds the minimum threshold, the simulation evaluator 450 may output a recommendation 452a to implement the potential policy. If, however, the allocation success rate that is determined during the simulation is less than the minimum threshold, the simulation evaluator 450 may output a recommendation 452b to not implement the potential policy.

Figure 5:
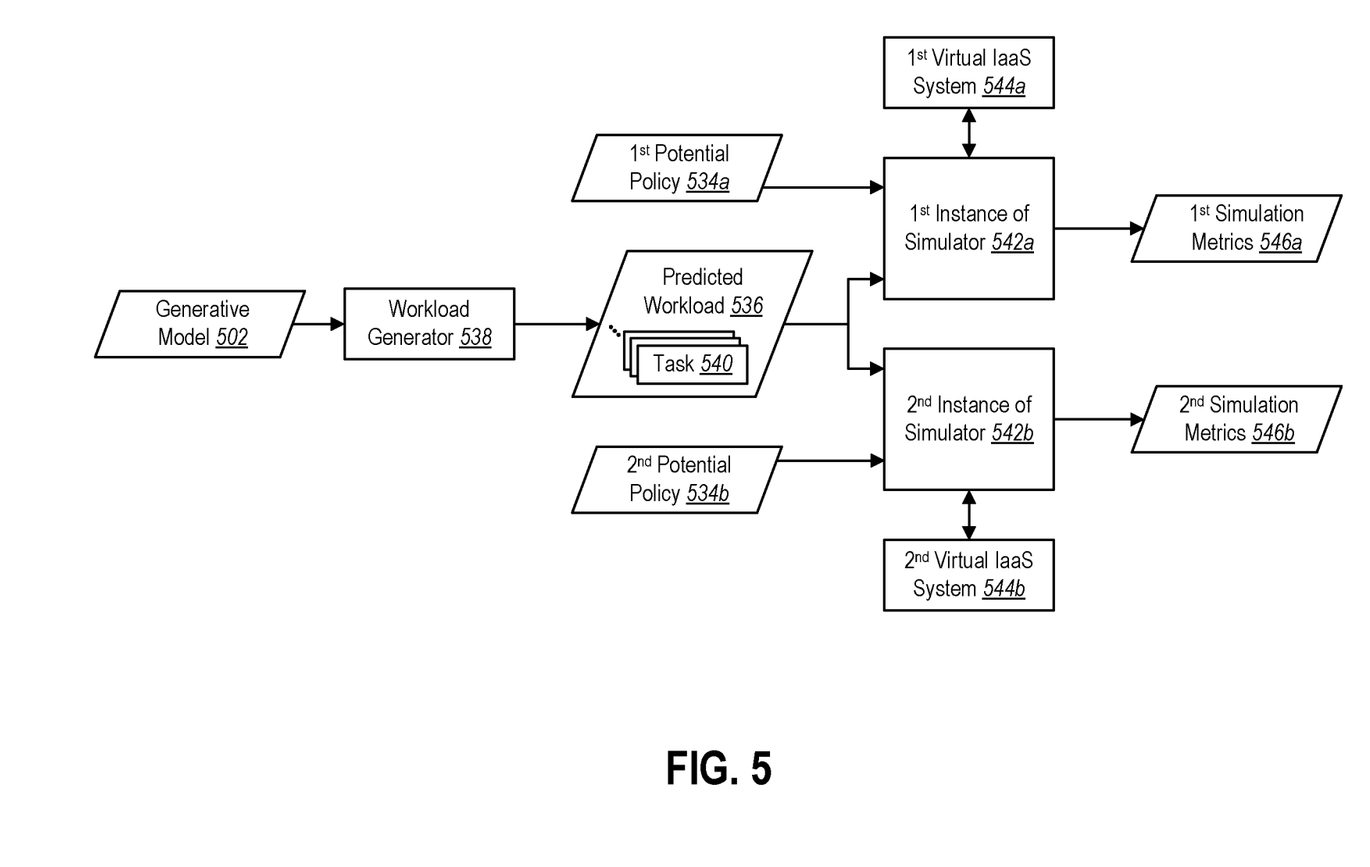
FIG. 5 illustrates an example showing how a generative model may be used to facilitate the simulation of a plurality of potential policies for an IaaS system.

FIG. 5 illustrates an example showing how a generative model 502 may be used to facilitate the simulation of a plurality of potential policies for an IaaS system. The example shown in FIG. 5 is similar in some respects to the example that was previously described in connection with FIG. 3. In the example shown in FIG. 5, however, two potential policies are shown, namely a first potential policy 534a and a second potential policy 534b.

The first potential policy 534a and the second potential policy 534b may be mutually exclusive. For example, the first potential policy 534a and the second potential policy 534b may be different algorithms (e.g., different cluster selection algorithms, different packing algorithms) that attempt to achieve the same objective, but in different and mutually exclusive ways. As another example, the first potential policy 534a and the second potential policy 534b may include different allocation limits that apply to the same set of physical computing resources (e.g., two different allocation limits for the same cluster or node). If the first potential policy 534a and the second potential policy 534b are mutually exclusive, simulations may be performed in order to determine which of the competing policies should be selected.

As in the example shown in FIG. 3, a generative model 502 corresponding to an IaaS system may be created and a predicted workload 536 for the IaaS system may be determined based on the generative model 502. A workload generator 538 is shown for providing this functionality. The predicted workload 536 may include various tasks 540 that are predicted to be performed by the IaaS system during a particular time interval.

In the example shown in FIG. 5, both the first potential policy 534a and the second potential policy 534b may be simulated based on the predicted workload 536. A first instance of a simulator 542a and a second instance of a simulator 542b are shown for providing this functionality. To simulate the first potential policy 534a, a first virtual IaaS system 544a may be created. Similarly, a second virtual IaaS system 544b may be created to simulate the second potential policy 534b. Both the first virtual IaaS system 544a and the second virtual IaaS system 544b may be representations of the actual IaaS system in which the first potential policy 534a and the second potential policy 534b are being considered for implementation.

The first potential policy 534a may be implemented in the first virtual IaaS system 544a, and the first virtual IaaS system 544a may then be made to experience the predicted workload 536 with the first potential policy 534a in effect. The simulation of the first potential policy 534a may produce first simulation metrics 546a that indicate one or more effects of the first potential policy 534a on the first virtual IaaS system 544a. Similarly, the second potential policy 534b may be implemented in the second virtual IaaS system 544b, and the second virtual IaaS system 544b may then be made to experience the predicted workload 536 with the second potential policy 534b in effect. The simulation of the second potential policy 534b may produce second simulation metrics 546b that indicate one or more effects of the second potential policy 534b on the second virtual IaaS system 544b.

The first simulation metrics 546a and the second simulation metrics 546b may be used to optimize the performance of the actual IaaS system. For example, if the first potential policy 534a and the second potential policy 534b are mutually exclusive and at least one of these policies should be implemented in the IaaS system, then the first simulation metrics 546a and the second simulation metrics 546b may be used to choose either the first potential policy 534a or the second potential policy 534b. More specifically, if the first simulation metrics 546a are more favorable than the second simulation metrics 546b, then the first potential policy 534a may be selected instead of the second potential policy 534b (or vice versa).

The example that is shown in FIG. 5 may be modified in many ways in accordance with the present disclosure. For example, if neither the first potential policy 534a nor the second potential policy 534b is required to be implemented in the IaaS system, then an administrator of the IaaS system may decide not to implement either policy if both the first simulation metrics 546a and the second simulation metrics 546b are unfavorable. As another alternative, if the first potential policy 534a and the second potential policy 534b are not mutually exclusive, then both policies may be selected for implementation in the IaaS system if the first simulation metrics 546a and the second simulation metrics 546b are both favorable.

Also, although the example shown in FIG. 5 involves the simulation of two different policies, the techniques disclosed herein may be utilized to perform simulations for more than two policies. Furthermore, although the example shown in FIG. 5 shows a separate simulation being performed for each potential policy, the techniques disclosed herein may be utilized to perform simulations on various combinations of policies. For example, instead of performing a first simulation to test a first potential policy 534a and performing a second simulation to test a second potential policy 534*b*, a first simulation may be performed to test a first combination of policies and a second simulation may be performed to test a second combination of policies.

Figure 6:
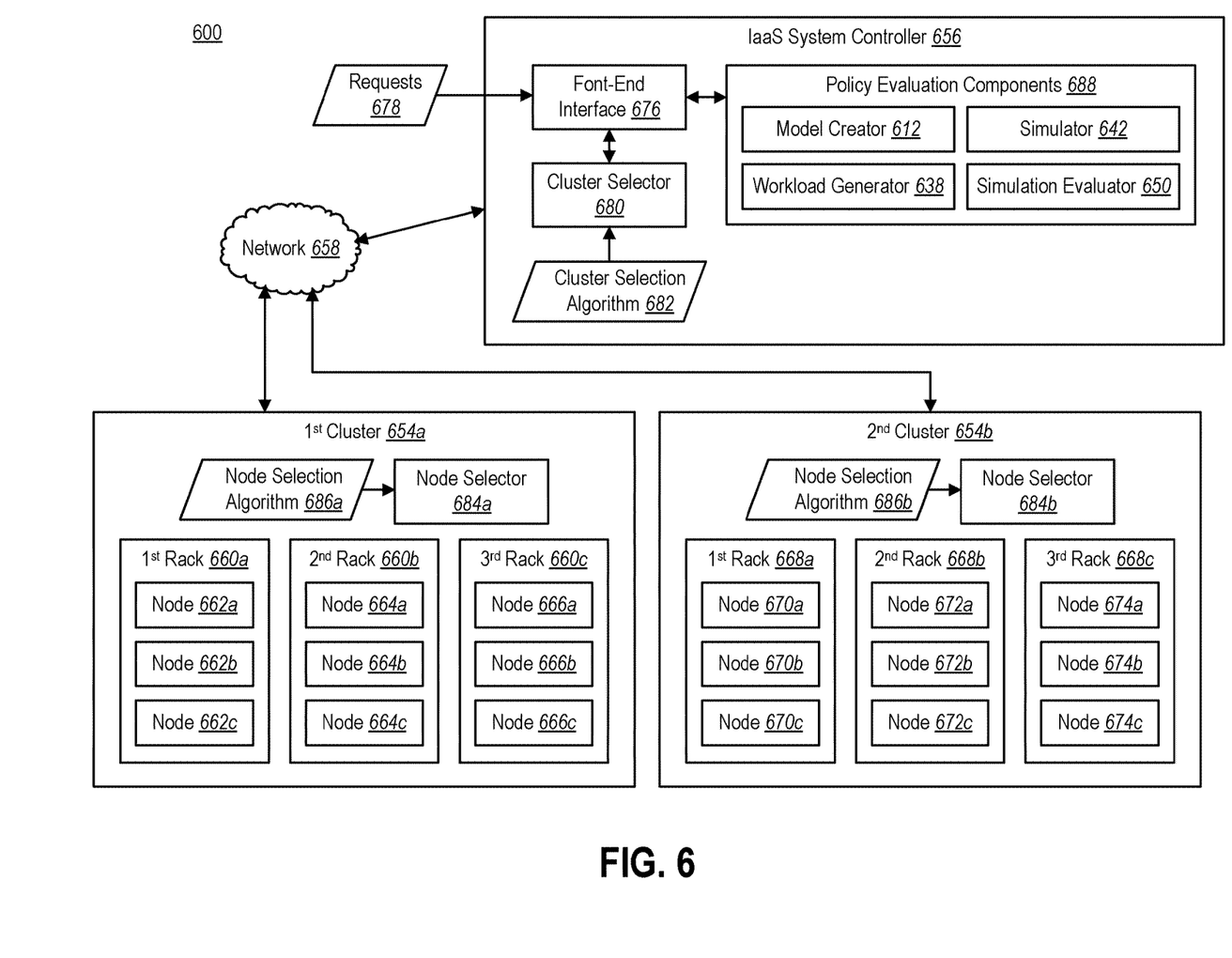
FIG. 6 illustrates an example of an IaaS system that includes policy evaluation components in accordance with the present disclosure.

FIG. 6 illustrates an example of an IaaS system 600 that includes policy evaluation components 688 in accordance with the present disclosure. For the sake of clarity, the IaaS system 600 is highly simplified and includes only two clusters, namely a first cluster 654*a* and a second cluster 654*b*. However, those skilled in the art will recognize that the techniques disclosed herein may be applied to IaaS systems that include large numbers (e.g., tens of thousands) of clusters. The clusters within an IaaS system may be located in many different data centers, which may be located in many different geographical regions around the world.

In the depicted IaaS system 600, the first cluster 654*a* includes a first rack 660*a*, a second rack 660*b*, and a third rack 660*c*. The first rack 660*a* includes nodes 662*a-c*, the second rack 660*b* includes nodes 664*a-c*, and the third rack 660*c* includes nodes 666*a-c*. Similarly, the second cluster 654*b* includes a first rack 668*a*, a second rack 668*b*, and a third rack 668*c*. The first rack 668*a* includes nodes 670*a-c*, the second rack 668*b* includes nodes 672*a-c*, and the third rack 668*c* includes nodes 674*a-c*.

The IaaS system 600 includes an IaaS system controller 656, which is in electronic communication with the first cluster 654*a* and the second cluster 654*b* via one or more computer networks 658 (which may include, for example, the Internet). The IaaS system controller 656 includes a front-end interface 676, which may be configured to process requests 678 from users of the IaaS system 600. Such requests 678 may include, for example, requests to create one or more virtual machines, requests to upgrade one or more existing virtual machines, and requests to delete one or more existing virtual machines.

The IaaS system controller 656 also includes a cluster selector 680. When a request 678 to create a new virtual machine is received, the cluster selector 680 may determine which of the available clusters will host the new virtual machine. In the depicted example, this involves choosing between the first cluster 654*a* and the second cluster 654*b*. (Of course, in real-world systems that implement the techniques disclosed herein, there may be a very large number of clusters (e.g., tens of thousands of clusters) to choose from) The cluster selector 680 may follow a cluster selection algorithm 682 to choose between the first cluster 654*a* and the second cluster 654*b*.

Once a particular cluster has been selected, that cluster selects a particular node within the cluster to host the new virtual machine. For example, suppose that the first cluster 654*a* is selected. The first cluster 654*a* may select a node from among the available nodes 662*a-c*, 664*a-c*, 666*a-c* in the first cluster 654*a*. The first cluster 654*a* is shown with a node selector 684*a* for providing this functionality. The node selector 684*a* may follow a node selection algorithm 686*a* to select a node from among the available nodes 662*a-c*, 664*a-c*, 666*a-c*. The second cluster 654*b* may include similar functionality for when the second cluster 654*b* is selected to host a new virtual machine. Thus, the second cluster 654*b* is shown with a node selector 684*b*. The node selector 684*b* may follow a node selection algorithm 686*b* to select a node from among the available nodes 670*a-c*, 672*a-c*, 674*a-c*.

The IaaS system controller 656 includes several policy evaluation components 688, including a model creator 612, a workload generator 638, a simulator 642, and a simulation evaluator 650. The policy evaluation components 688 may facilitate the evaluation of potential policies for the IaaS system 600. The model creator 612 may be configured to create a generative model for an IaaS system (e.g., as described above in connection with the model creator 112 shown in FIG. 1). The workload generator 638 may be configured to use a generative model to create a predicted workload for an IaaS system (e.g., as described above in connection with the workload generator 338 shown in FIG. 3 and/or the workload generator 558 shown in FIG. 5). The simulator 642 may be configured to use a predicted workload to simulate one or more potential policies for the IaaS system 600 (e.g., as described above in connection with the simulator 342 shown in FIG. 3 and/or the simulators 542*a-b* shown in FIG. 5). The simulation evaluator 650 may be configured to determine whether simulation metrics satisfy applicable implementation conditions (e.g., as described above in connection with the simulation evaluator 450 shown in FIG. 4).

The policy evaluation components 688 may be used to evaluate many different types of potential policies for the IaaS system 600 in accordance with the present disclosure. For example, the policy evaluation components 688 may be used to choose a cluster selection algorithm 682 from among a plurality of possible cluster selection algorithms. As another example, the policy evaluation components 688 may be used to choose the node selection algorithms 686*a-b* that are used by the first cluster 654*a* and the second cluster 654*b*. The node selection algorithms 686*a-b* may be selected from among a plurality of possible node selection algorithms. In some implementations, the node selection algorithm 686*a* that is selected for use by the first cluster 654*a* may be the same as the node selection algorithm 686*b* that is selected for use by the second cluster 654*b*. Alternatively, different node selection algorithms 686*a-b* may be selected for different clusters 654*a-b*. As yet another example, the policy evaluation components 688 may be used to choose one or more allocation limits that may be applied to the clusters and/or the nodes in the IaaS system 600.

In FIG. 6, the policy evaluation components 688 are included in an IaaS system controller 656, which is shown as being separate from the clusters 654*a-b* in the IaaS system 600. The IaaS system controller 656 may be implemented as a distributed system, i.e., a computer system whose components are located on multiple computing devices. In alternative implementations, the policy evaluation components 688 may be implemented, either partially or wholly, within one or more of the clusters 654*a-b* in the IaaS system 600.

Figure 7:
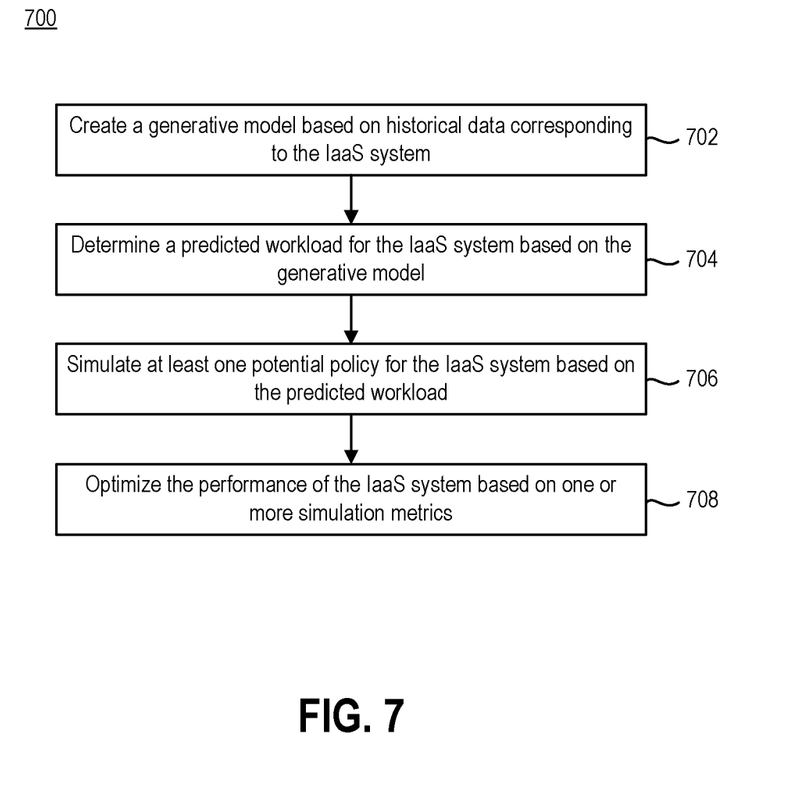
FIG. 7 illustrates an example of a method for evaluating at least one potential policy for an IaaS system in accordance with the present disclosure.

FIG. 7 illustrates an example of a method 700 for evaluating at least one potential policy for an IaaS system in accordance with the present disclosure. In accordance with the method 700, a generative model may be created 702 based on historical data corresponding to the IaaS system. A predicted workload for the IaaS system may be determined 704 based on the generative model. At least one potential policy for the IaaS system may be simulated 706 based on the predicted workload. This may produce one or more simulation metrics that indicate effects of the at least one potential policy. The method 700 may also include optimizing 708 the performance of the IaaS system based on the one or more simulation metrics.

Figure 8:
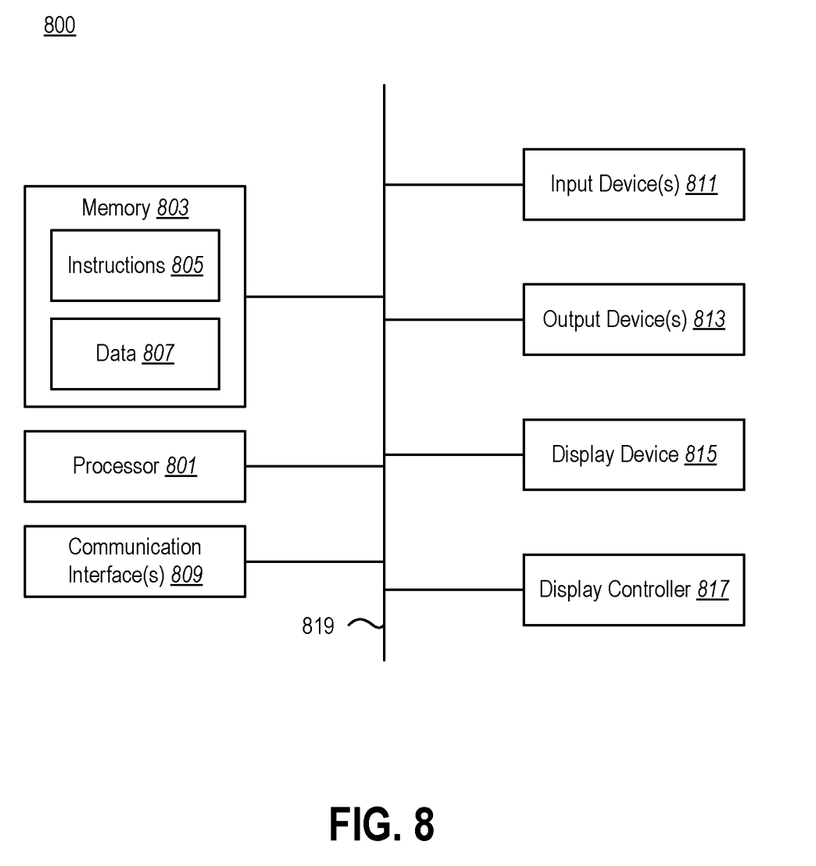
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 7, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the steps, operations, actions, or other functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

In accordance with on aspect of the present disclosure, a method for evaluating at least one potential policy for an infrastructure as a service (IaaS) system is disclosed. The method may include determining a predicted workload for the IaaS system based on at least one generative model corresponding to the IaaS system; simulating the at least one potential policy for the IaaS system based on the predicted workload, thereby producing one or more simulation metrics that indicate effects of the at least one potential policy; and optimizing performance of the IaaS system based on the one or more simulation metrics.

The method may further include creating the at least one generative model based on historical data corresponding to the IaaS system.

Creating the at least one generative model may include determining causal relationships between variables related to the IaaS system and how the causal relationships change over time and determining joint probabilities between the variables for which a causal relationship exists.

The at least one generative model may include a probabilistic graphical model.

The predicted workload may include a plurality of tasks that are predicted to be performed by the IaaS system. Simulating the at least one potential policy may include implementing the at least one potential policy in a virtual IaaS system and causing the virtual IaaS system to perform the plurality of tasks with the at least one potential policy in effect.

Optimizing the performance of the IaaS system may include determining whether the one or more simulation metrics satisfy at least one implementation condition, providing a first recommendation to implement the at least one potential policy if the one or more simulation metrics satisfy the at least one implementation condition, and providing a second recommendation to not implement the at least one potential policy if the one or more simulation metrics do not satisfy the at least one implementation condition.

Optimizing the performance of the IaaS system may include selecting a first potential policy for the IaaS system over a second potential policy for the IaaS system because first simulation metrics corresponding to the first potential policy are more favorable than second simulation metrics corresponding to the second potential policy.

In accordance with another aspect of the present disclosure, a system for evaluating at least one potential policy for an infrastructure as a service (IaaS) system is disclosed. The system may include one or more processors and memory that includes instructions that are executable by the one or more processors to perform operations. The operations may include determining a predicted workload for the IaaS system based on at least one generative model corresponding to the IaaS system; simulating the at least one potential policy for the IaaS system based on the predicted workload, thereby producing one or more simulation metrics that indicate effects of the at least one potential policy; and optimizing performance of the IaaS system based on the one or more simulation metrics.

The operations may further include creating the at least one generative model based on historical data corresponding to the IaaS system.

Creating the at least one generative model may include determining causal relationships between variables related to the IaaS system and how the causal relationships change over time and determining joint probabilities between the variables for which a causal relationship exists.

The at least one generative model may include a probabilistic graphical model.

The predicted workload may include a plurality of tasks that are predicted to be performed by the IaaS system. Simulating the at least one potential policy may include implementing the at least one potential policy in a virtual IaaS system and causing the virtual IaaS system to perform the plurality of tasks with the at least one potential policy in effect.

Optimizing the performance of the IaaS system may include determining whether the one or more simulation metrics satisfy at least one implementation condition, providing a first recommendation to implement the at least one potential policy if the one or more simulation metrics satisfy the at least one implementation condition, and providing a second recommendation to not implement the at least one potential policy if the one or more simulation metrics do not satisfy the at least one implementation condition.

Optimizing the performance of the IaaS system may include selecting a first potential policy for the IaaS system over a second potential policy for the IaaS system because first simulation metrics corresponding to the first potential policy are more favorable than second simulation metrics corresponding to the second potential policy.

In accordance with another aspect of the present disclosure, a computer-readable medium having computer-executable instructions stored thereon is disclosed. When executed, the computer-executable instructions may cause one or more processors to perform operations including determining a predicted workload for an infrastructure as a service (IaaS) system based on at least one generative model corresponding to the IaaS system; simulating at least one potential policy for the IaaS system based on the predicted workload, thereby producing one or more simulation metrics that indicate effects of the at least one potential policy; and optimizing performance of the IaaS system based on the one or more simulation metrics.

The operations may further include creating the at least one generative model based on historical data corresponding to the IaaS system.

Creating the at least one generative model may include determining causal relationships between variables related to the IaaS system and how the causal relationships change over time and determining joint probabilities between the variables for which a causal relationship exists.

The predicted workload may include a plurality of tasks that are predicted to be performed by the IaaS system. Simulating the at least one potential policy may include implementing the at least one potential policy in a virtual IaaS system and causing the virtual IaaS system to perform the plurality of tasks with the at least one potential policy in effect.

Optimizing the performance of the IaaS system may include determining whether the one or more simulation metrics satisfy at least one implementation condition, providing a first recommendation to implement the at least one potential policy if the one or more simulation metrics satisfy the at least one implementation condition, and providing a second recommendation to not implement the at least one potential policy if the one or more simulation metrics do not satisfy the at least one implementation condition.

Optimizing the performance of the IaaS system may include selecting a first potential policy for the IaaS system over a second potential policy for the IaaS system because first simulation metrics corresponding to the first potential policy are more favorable than second simulation metrics corresponding to the second potential policy.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for evaluating at least one potential policy for an infrastructure as a service (IaaS) system, comprising:
   creating at least one generative model based on historical data corresponding to the IaaS system, wherein creating the at least one generative model comprises:
      determining causal relationships between variables related to the IaaS system and how the causal relationships change over time; and
      determining joint probabilities between the variables for which a causal relationship exists;
   determining a predicted workload for the IaaS system based on the at least one generative model corresponding to the IaaS system;
   simulating the at least one potential policy for the IaaS system based on the predicted workload, thereby producing one or more simulation metrics that indicate effects of the at least one potential policy; and
   optimizing performance of the IaaS system based on the one or more simulation metrics.

2. The method of claim 1, wherein the at least one generative model comprises a probabilistic graphical model.

3. The method of claim 1, wherein:
the predicted workload comprises a plurality of tasks that are predicted to be performed by the IaaS system; and
simulating the at least one potential policy comprises implementing the at least one potential policy in a virtual IaaS system and causing the virtual IaaS system to perform the plurality of tasks with the at least one potential policy in effect.

4. The method of claim 1, wherein optimizing the performance of the IaaS system comprises:
determining whether the one or more simulation metrics satisfy at least one implementation condition;
providing a first recommendation to implement the at least one potential policy if the one or more simulation metrics satisfy the at least one implementation condition; and
providing a second recommendation to not implement the at least one potential policy if the one or more simulation metrics do not satisfy the at least one implementation condition.

5. The method of claim 1, wherein optimizing the performance of the IaaS system comprises selecting a first potential policy for the IaaS system over a second potential policy for the IaaS system because first simulation metrics corresponding to the first potential policy are more favorable than second simulation metrics corresponding to the second potential policy.

6. A system for evaluating at least one potential policy for an infrastructure as a service (IaaS) system, comprising:
one or more processors; and
memory comprising instructions that are executable by the one or more processors to perform operations comprising:
determining a predicted workload for the IaaS system based on at least one generative model corresponding to the IaaS system;
simulating the at least one potential policy for the IaaS system based on the predicted workload, thereby producing one or more simulation metrics that indicate effects of the at least one potential policy; and
optimizing performance of the IaaS system based on the one or more simulation metrics, wherein optimizing the performance of the IaaS system comprises:
determining whether the one or more simulation metrics satisfy at least one implementation condition;
providing a first recommendation to implement the at least one potential policy if the one or more simulation metrics satisfy the at least one implementation condition; and
providing a second recommendation to not implement the at least one potential policy if the one or more simulation metrics do not satisfy the at least one implementation condition.

7. The system of claim 6, wherein the operations further comprise creating the at least one generative model based on historical data corresponding to the IaaS system.

8. The system of claim 7, wherein creating the at least one generative model comprises:
determining causal relationships between variables related to the IaaS system and how the causal relationships change over time; and
determining joint probabilities between the variables for which a causal relationship exists.

9. The system of claim 6, wherein the at least one generative model comprises a probabilistic graphical model.

10. The system of claim 6, wherein:
the predicted workload comprises a plurality of tasks that are predicted to be performed by the IaaS system; and
simulating the at least one potential policy comprises implementing the at least one potential policy in a virtual IaaS system and causing the virtual IaaS system to perform the plurality of tasks with the at least one potential policy in effect.

11. The system of claim 6, wherein optimizing the performance of the IaaS system comprises selecting a first potential policy for the IaaS system over a second potential policy for the IaaS system because first simulation metrics corresponding to the first potential policy are more favorable than second simulation metrics corresponding to the second potential policy.

12. A non-transitory computer-readable medium having computer-executable instructions stored thereon that, when executed, cause one or more processors to perform operations comprising:
determining a predicted workload for an infrastructure as a service (IaaS) system based on at least one generative model corresponding to the IaaS system;
simulating at least one potential policy for the IaaS system based on the predicted workload, thereby producing one or more simulation metrics that indicate effects of the at least one potential policy; and
optimizing performance of the IaaS system based on the one or more simulation metrics, wherein optimizing the performance of the IaaS system comprises selecting a first potential policy for the IaaS system over a second potential policy for the IaaS system because first simulation metrics corresponding to the first potential policy are more favorable than second simulation metrics corresponding to the second potential policy.

13. The non-transitory computer-readable medium of claim 12, wherein the operations further comprise creating the at least one generative model based on historical data corresponding to the IaaS system.

14. The non-transitory computer-readable medium of claim 13, wherein creating the at least one generative model comprises:
determining causal relationships between variables related to the IaaS system and how the causal relationships change over time; and
determining joint probabilities between the variables for which a causal relationship exists.

15. The non-transitory computer-readable medium of claim 12, wherein:
the predicted workload comprises a plurality of tasks that are predicted to be performed by the IaaS system; and
simulating the at least one potential policy comprises implementing the at least one potential policy in a virtual IaaS system and causing the virtual IaaS system to perform the plurality of tasks with the at least one potential policy in effect.

16. The non-transitory computer-readable medium of claim 12, wherein optimizing the performance of the IaaS system comprises:
determining whether the one or more simulation metrics satisfy at least one implementation condition;
providing a first recommendation to implement the at least one potential policy if the one or more simulation metrics satisfy the at least one implementation condition; and providing a second recommendation to not implement the at least one potential policy if the one or more simulation metrics do not satisfy the at least one implementation condition.

* * * * *